(12) United States Patent
Mulholland et al.

(10) Patent No.: US 12,554,405 B2
(45) Date of Patent: Feb. 17, 2026

(54) GARBAGE COLLECTION AND DATA COMPRESSION VIA A COMPUTATIONAL STORAGE

(71) Applicant: INTERNATIONAL BUSINESS MACHINES CORPORATION, Armonk, NY (US)

(72) Inventors: Miles Mulholland, Eastleigh (GB); Imran Imtiaz, Manchester (GB); Anuj Chandra, Bengaluru (IN); Graham Woodward, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 18/607,948

(22) Filed: Mar. 18, 2024

(65) Prior Publication Data

US 2025/0291491 A1 Sep. 18, 2025

(51) Int. Cl.
*G06F 12/00* (2006.01)
*G06F 3/06* (2006.01)

(52) U.S. Cl.
CPC .......... *G06F 3/0613* (2013.01); *G06F 3/0641* (2013.01); *G06F 3/0643* (2013.01); *G06F 3/0656* (2013.01); *G06F 3/0683* (2013.01)

(58) Field of Classification Search
CPC .... G06F 3/0613; G06F 3/0641; G06F 3/0643; G06F 3/0656; G06F 3/0683; G06F 12/0253; G06F 16/1744
See application file for complete search history.

(56) References Cited

U.S. PATENT DOCUMENTS

| | | | |
|---|---|---|---|
| 9,967,580 B2 | 5/2018 | Newman et al. | |
| 2022/0253216 A1 | 8/2022 | Grunwald et al. | |
| 2022/0342610 A1* | 10/2022 | Nirmale | G06F 3/0641 |
| 2023/0024949 A1 | 1/2023 | Ammari et al. | |
| 2023/0084539 A1 | 3/2023 | Lee et al. | |
| 2023/0088291 A1 | 3/2023 | Tsuji et al. | |

OTHER PUBLICATIONS

"Computational Storage Architecture and Programming Model," SNIA Advancing storage information technology, Aug. 30, 2022, 71 pp.

* cited by examiner

*Primary Examiner* — Shawn X Gu
(74) *Attorney, Agent, or Firm* — KONRAD, RAYNES, DAVDA & VICTOR LLP; Rabindranath Dutta (57) ABSTRACT

Metadata associated with a file is received, where the metadata indicates whether data included in the file is transformable or not. The metadata of the file is processed to determine that the metadata indicates that the data is transformable. The data is transformed in accordance with indication provided in the metadata during garbage collection in a computational storage.

18 Claims, 9 Drawing Sheets

GARBAGE COLLECTION AND DATA COMPRESSION VIA A COMPUTATIONAL STORAGE

BACKGROUND

Embodiments relate to a method, system, and computer program product that provide mechanisms for performing garbage collection and data compression via a computational storage.

A computing environment may be comprised of a storage controller that is coupled to a computational storage, where the computational storage comprises a storage architecture in which storage devices have additional compute capabilities associated with them. The presence of compute capabilities on the storage devices allows for operations against the data which would previously be non-viable for the storage controller to perform. In the data storage environment, the storage controller allows one or more host computational devices to access data stored in storage devices of the computational storage.

Thin provisioning is a mechanism in which a storage does not wholly allocate the advertised capacity of the storage. Storage is only allocated when it is used. Both block and file systems have equivalents of thin provisioning. File systems are effectively thin provisioned by their nature as files can only be allocated upon creation, and block storage systems can have thin provisioning implemented by using a forward lookup structure to map allocated ranges to the physical storage medium. Storage can either be kept local to a volume, or the storage may be pooled among multiple volumes. Thin provisioning allows the implementation of advanced space saving techniques, such as compression and deduplication as a process needs only to update a forward lookup structure with appropriate details.

Garbage collection is an operation where, in a block storage system, a storage system coalesces free capacity into usable units. This is typically a process associated with log structured arrays: these often try to avoid overwriting in place. In flash storage hardware, such as solid-state drives (SSDs) such processes are performed in an attempt to reduce wear on flash chips themselves.

SUMMARY

Provided are a method, system, and computer program product in which metadata associated with a file is received, wherein the metadata indicates whether data included in the file is transformable or not. The metadata of the file is processed to determine that the metadata indicates that the data is transformable. The data is transformed in accordance with indication provided in the metadata during garbage collection in a computational storage.

In certain embodiments, wherein the transforming of the data includes compressing of the data, and wherein a storage controller offloads the garbage collection and the compressing of the data to the computational storage.

In further embodiments, thin provisioning and deduplication are implemented in the storage controller and the computational storage.

In yet further embodiments, lossy compression is performed by using the metadata, and wherein the metadata is included in a header of the file.

In certain embodiments, the process performs operations, the operations comprising: enabling the computational storage to perform format conversion and upon completion, store a range in a buffer on a device; and allocating, once the storage controller has knowledge of a size of the buffer, capacity on the device as a new destination location, wherein a new buffer is written to disk and marked as a new write location of a range of capacity.

In additional embodiments, the operations further comprise identifying, while performing initial write input/output (I/O) operations, ranges of the disk associated with a data format, and based on the ranges, estimates are made as to what savings can be made, and a garbage collection heap structure is used to select what range to garbage collect next.

In yet further embodiments, the operations further comprise allowing a garbage collection mechanism to schedule operations and reclaim consistent amounts of space.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized, and structural and operational changes may be made.

Thin provisioning systems that use compression typically need to garbage collect in order to reclaim storage capacity. This operation involves the migration of valid data from a given range which has invalidations present in it. From this, the storage system can reuse the range as a contiguous unit. Garbage collecting storage systems often have a concept of 'slack space'. The slack space corresponds to invalidated ranges which are not immediately garbage collected as the system hopes to receive further invalidations. By waiting for invalidations, the storage system may be able to significantly reduce the amount of data needed to be migrated as part of a garbage collection operation to free up more regions. This can significantly improve performance if the capacity is available.

As a garbage collecting storage controller begins to run out of space, slack space becomes less available, and invalidations need to be garbage collected more urgently. This uses more input/Output (I/O) operations (IOPs), and in turn can impact the performance of the storage controller. If additional space saving mechanisms can be found to provide more free space, the storage controller can improve its performance.

Certain embodiments provide a computational storage that offers garbage collection mechanisms certain processes to optimize space efficiency in the event that capacity savings become necessary. This is done by leveraging format-change computational storage techniques in the event that capacity becomes limited. This allows for garbage collection to reduce the amount of capacity used by a given range of capacity as an opportunistic mechanism to recover additional space.

Certain embodiments leverage format change operations to allow garbage collection to opportunistically free additional capacity, leveraging computational storage operations.

In the event that a storage system begins to get close to running out of space, it may be desirable to perform operations to optimize storage use further. Typically, the computational power required to convert from one storage format to another is not available to a storage system without impacting performance-however computational storage operations give certain embodiments the opportunity to perform some of these operations in situ.

For example, let the case where there is an image on disk be considered. The image is written to disk in a format where it is specified with a header that it is acceptable for the storage system to reduce the quality in a lossy fashion.

The garbage collecting storage system may leverage computational storage operations to perform the format conversion. The computational storage mechanism may perform the format conversion, and upon completion, store the range in a buffer on the device. Once the storage controller has knowledge of the size of the buffer, capacity on the device may be allocated as the new destination location, and the new buffer may be written to disk. This may then be marked as the new write location of a range of capacity.

This operation will effectively reduce the virtual size of the block in question: to this end, the format would specify that padding the virtual domain with zeroes would be an acceptable. As such, the layout of the virtual domain remains consistent whilst space savings are achieved.

When performing initial write I/Os, it would be advisable to identify ranges of the disk associated with this data format. Based on this, estimates could be made as to what savings could be made, and stored in the garbage collection heap structure, which is used to select what range to garbage collect next. From this, it would be possible to perform this operation in a targeted fashion in the event that the system started to get low on space. This would also allow the garbage collection (GC) mechanism to schedule these operations and reclaim consistent amounts of space. This in turn would mean this can be applied in a fashion which minimizes performance impact as typically GC performance degrades significantly when low free space is available.

Such embodiments include a block storage system to reclaim additional physical capacity in the event that it gets low on space, while maintaining quality in event that the storage system does not become low on space. It leverages the computational capacity available to it in the form of compute-capable drives, and allows garbage collection to avoid out-of-space situations.

The approach specified may be advantageous to storage systems storing video or image data. By performing these operations, certain embodiments can reclaim additional free capacity if garbage collection requires the additional space.

Certain embodiments improve the operations of a computational device, by providing a mechanism to change the size of data in a lossy fashion by means of leveraging garbage collection when the storage capacity is limited. Certain operations convert files to a more compressed/lossy format during a garbage collection process to add storage capacity when the capacity thresholds are about to be reached.

Figure 1:
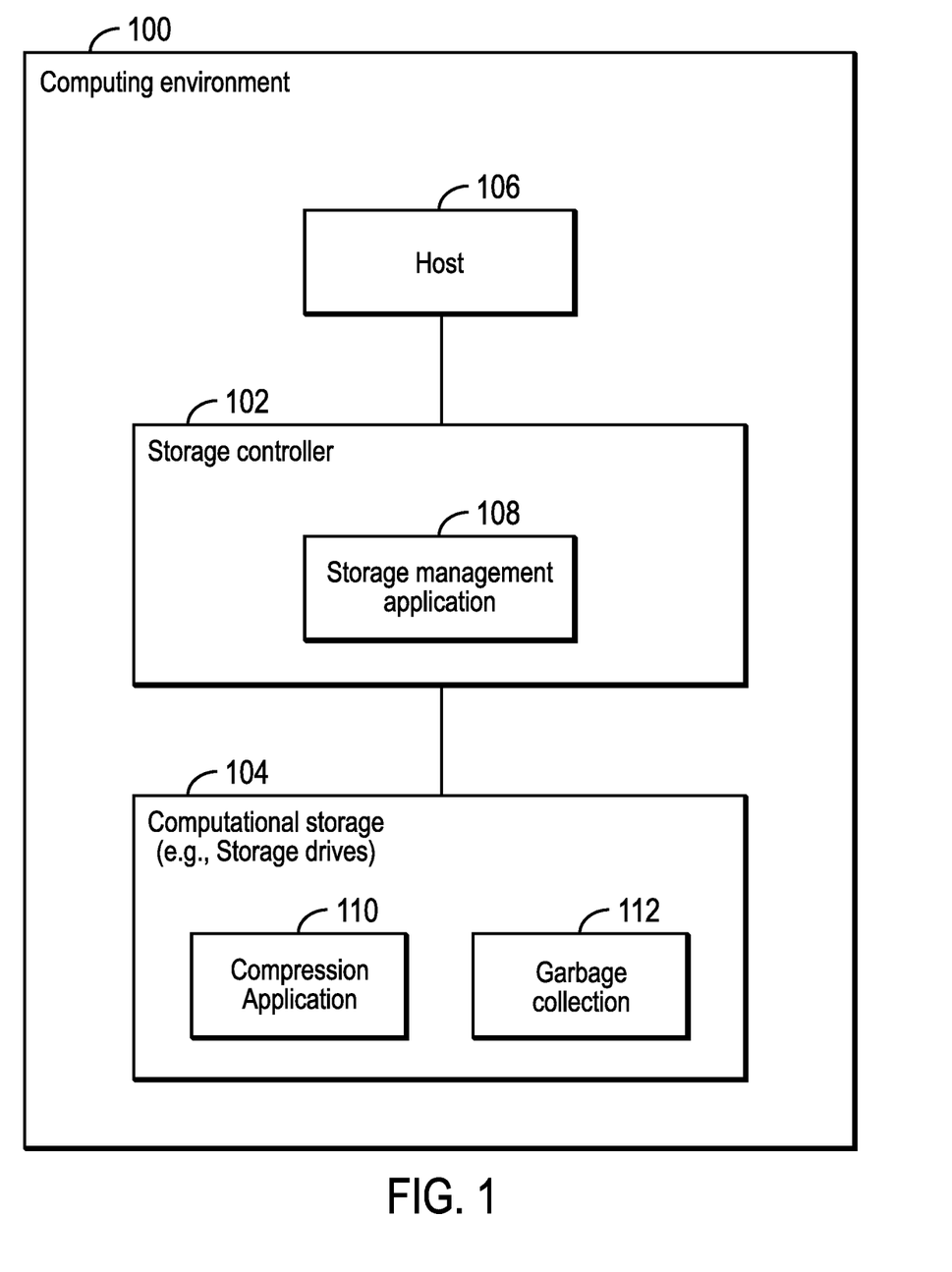
FIG. 1 illustrates a block diagram of a computing environment, in accordance with certain embodiments.

FIG. 1 illustrates a block diagram of a computing environment 100, in accordance with certain embodiments.

A storage controller 102 is coupled to a computational storage 104, where the computational storage 104 may be comprised of one or more storage drives with compute capabilities. The storage controller 102 represents the physical storage volumes stored in the computational storage 104 as logical storage volumes, and provides access to the logical storage volumes to the host 106, where the host 106 comprises a computational device that may access data stored in the computational storage 104 via the storage controller 102.

The storage controller 102 and the host 106 may in certain embodiments comprise any suitable computational device known in the art such as a server, a personal computer, a laptop, a telephony device, a mainframe, etc.

A storage management application 108 executes in the storage controller 102. The storage management application 108 may offload certain tasks to the computational storage 104. For example, compression and garbage collection may be initiated by the storage management application 108 to be performed in the computational storage 104.

A compression application 110 may execute in the computational storage 104 and garbage collection 112 may be performed in the computational storage 104.

In certain embodiments, the storage management application 108, the compression application 110 and the garbage collection 112 may be implemented in hardware, firmware, software, or any combination thereof.

Figure 2:
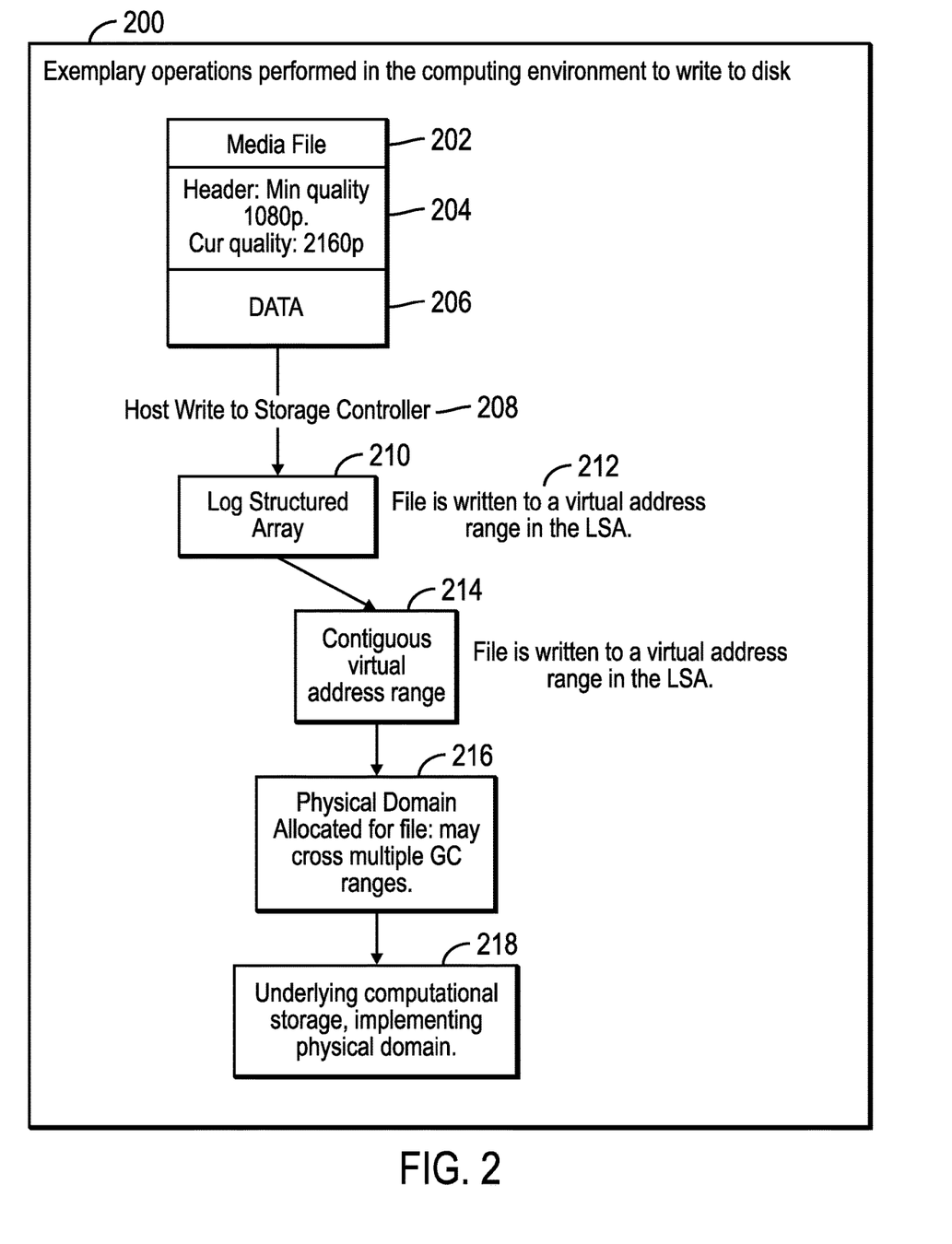
FIG. 2 illustrates a block diagram that shows exemplary operations performed in the computing environment to write to disk, in accordance with certain embodiments.

FIG. 2 illustrates a block diagram 200 that shows exemplary operations being performed in the computing environment 100 to write to disk in the computational storage 104, in accordance with certain embodiments.

A media file 202 may include a header 204 and data 206. The header 204 may include information about the current quality of the data and the minimum quality of the data that would be acceptable. For example, in FIG. 2 the data 206 is currently in the 2160$p$ resolution which is a relatively higher resolution than the minimum 1080p resolution to which the data 206 could be compressed via lossy compression and still be acceptable to a user (2160p and 1080p are resolutions for video known in the art).

The host 106 writes the media file 202 to the storage controller 102 (as shown via reference numeral 208) in a virtual address range of a log structured array (LSA) [as shown via reference numerals 210, 212]. The virtual address range is contiguous as shown via reference numeral 214.

A physical domain is allocated for the media file where multiple garbage collection (GC) ranges may be crossed [as shown via reference numeral 216], where in certain embodiments, the underlying computational storage 104 implements the physical domain [as shown via reference numeral 218].

Figure 3:
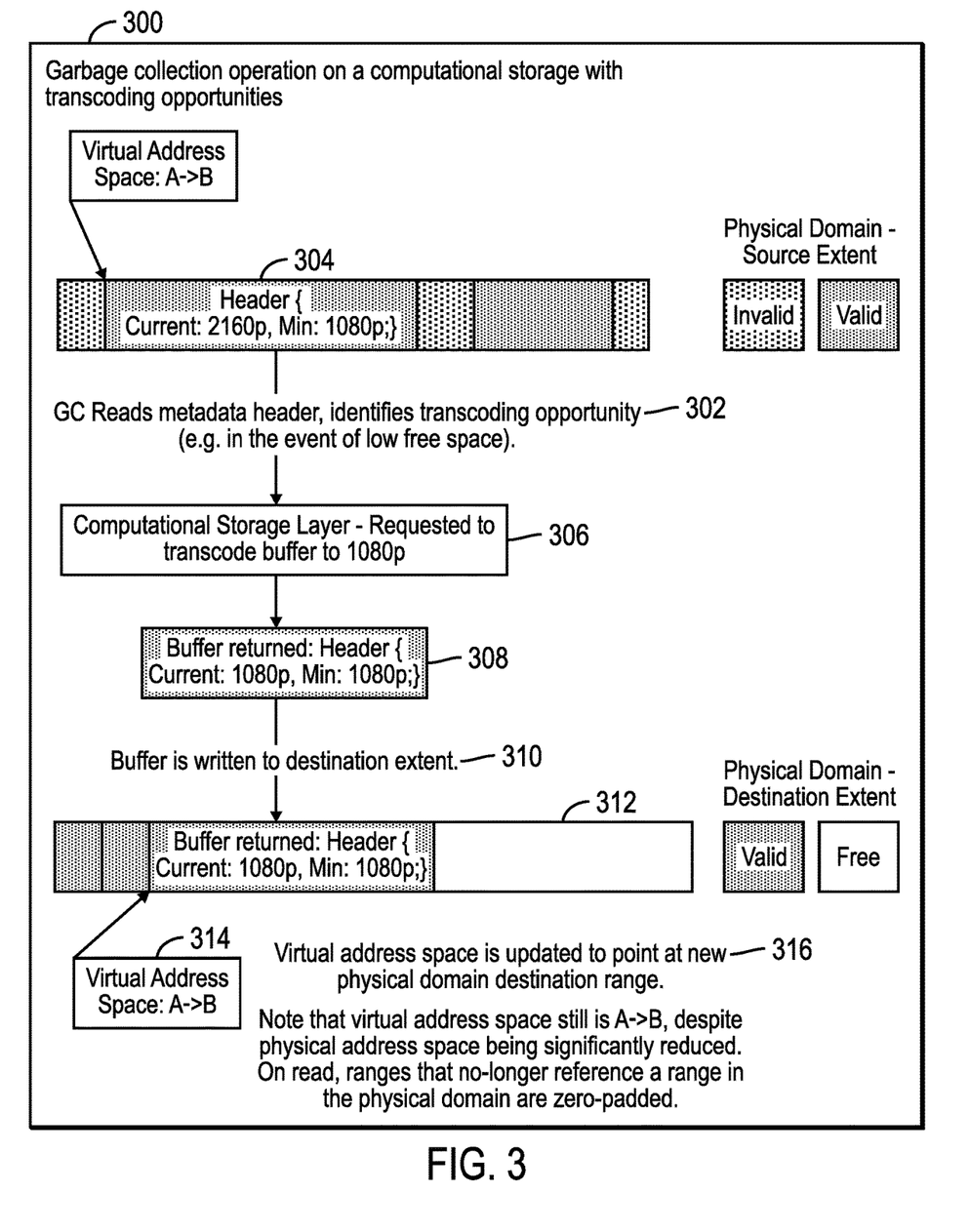
FIG. 3 illustrates a block diagram that shows garbage collection operation on computational storage with transcoding opportunities, in accordance with certain embodiments.

FIG. 3 illustrates a block diagram 300 that shows garbage collection operations on a computational storage with transcoding opportunities, in accordance with certain embodiments.

The process for garbage collection 112 in the computational storage 104 reads the metadata header 304, and identifies transcoding opportunity in the event of low free space (as shown via reference numeral 302). The term "transcoding" refers to a change in the format of the data. For example, since the header 204 indicates that the current resolution is 2160p whereas the minimum acceptable resolution is 1080p, the data in the media file may be transcoded to the 1080p format and this leads to a compression of the data.

Once the transcoding opportunity is determined then the computational storage 104 is requested to transcode the buffers to 1080p resolution (shown via reference numeral 306). Control proceeds to block 308 where the buffer returned shows header with current resolution of 1080p and also minimum resolution of 1080p, and the buffering is written to a destination extent (shown via reference numeral 310). The header and data are written as shown via reference numeral 312.

It may be noted that the virtual address space is updated to point to a new physical domain destination range. The virtual address space is still A->B despite the physical address space being significantly reduced. On read, ranges that no longer reference a range in the physical domain are zero-padded. The file/object store continues to have a layout that it expects to have [shown via reference numeral 314, 316].

Figure 4:
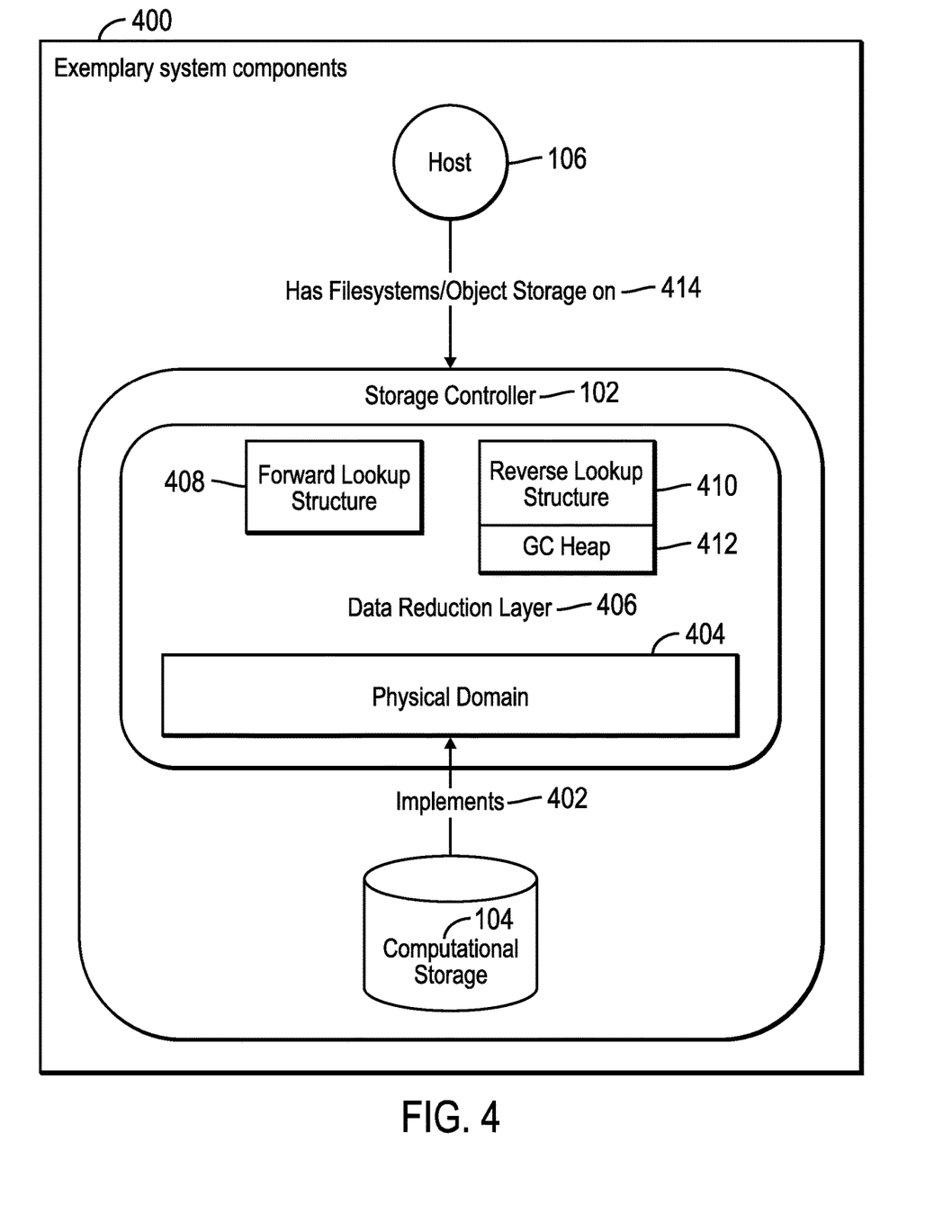
FIG. 4 illustrates a block diagram that shows the architecture with exemplary system components, in accordance with certain embodiments.

FIG. 4 illustrates a block diagram 400 that shows the architecture with exemplary system components, in accordance with certain embodiments.

The computational storage 104 implements the physical domain (as shown via reference numerals 402, 404). The data reduction layer 406 of the architecture is shown, where the data reduction layer 406 causes the compression to be performed. The forward lookup structure 408, the reverse lookup structure 410 and the garbage collection heap 412 are also shown in the architecture. In the architecture, the host 106 accesses the file systems and object storage on storage controller 102 that manages the computational storage 104 (as shown via reference numeral 414).

Figure 5:
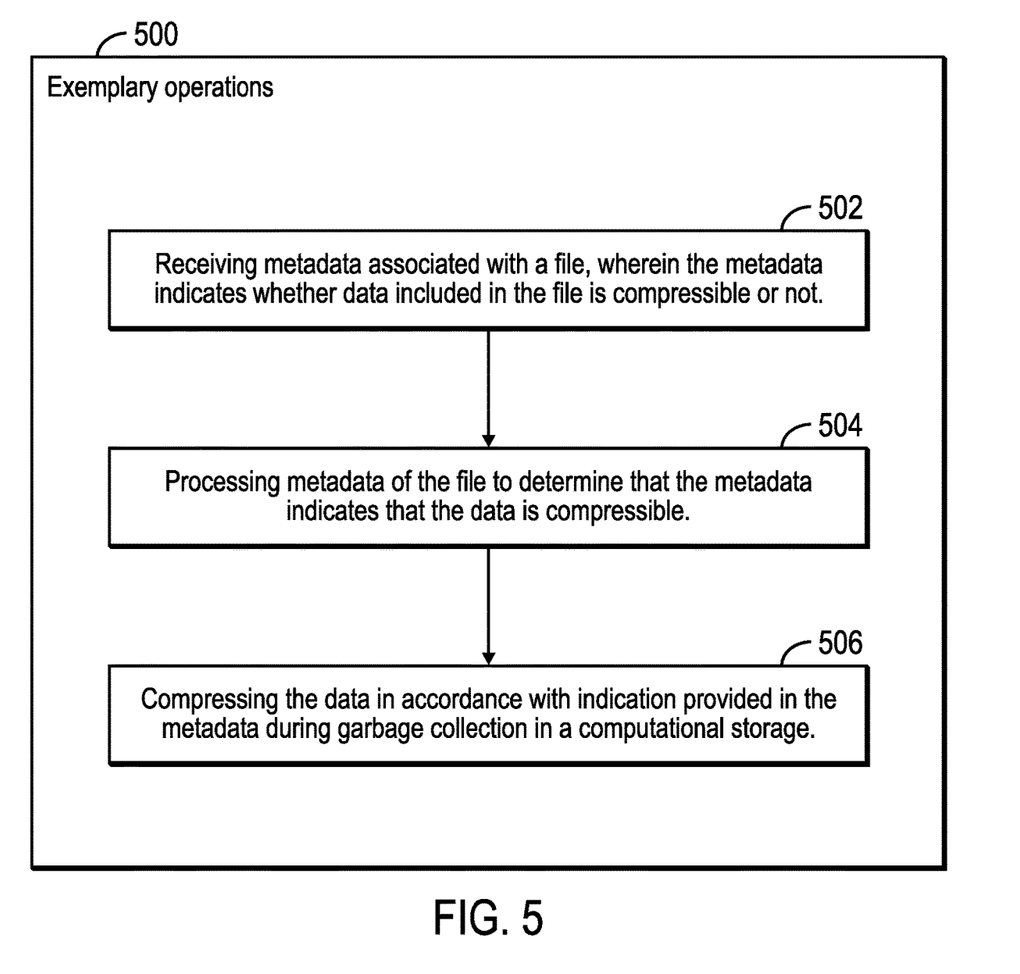
FIG. 5 illustrates a flowchart that shows exemplary operations in accordance with certain embodiments.

FIG. 5 illustrates a flowchart 500 that shows exemplary operations in accordance with certain embodiments.

Control starts at block 502 in which metadata associated with a file is received, where the metadata indicates whether data included in the file is compressible or not. The metadata of the file is processed to determine (at block 504) that the metadata indicates that the data is compressible. Control proceeds to block 506, in which the data is compressed in accordance with indication provided in the metadata during garbage collection in a computational storage.

Figure 6:
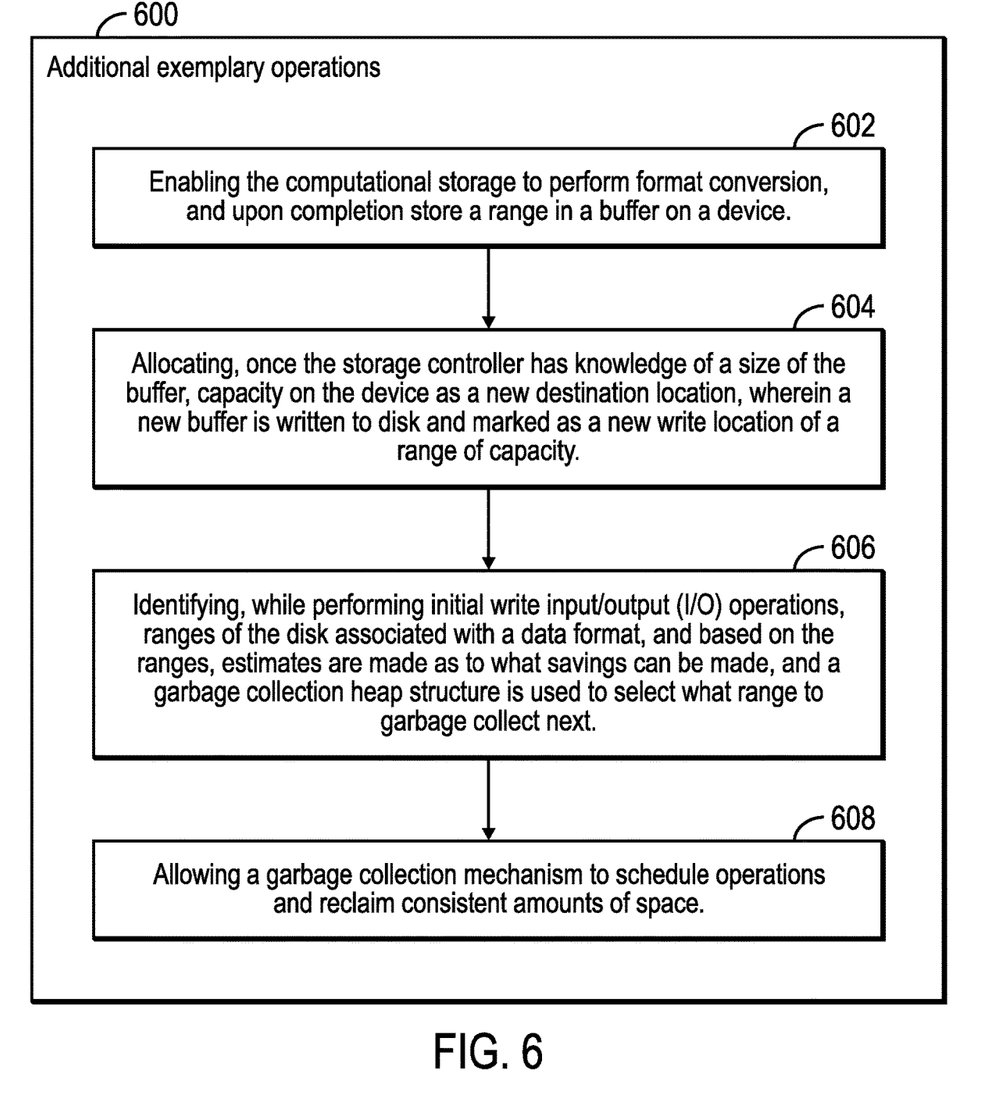
FIG. 6 illustrates a flowchart that shows additional exemplary operations in accordance with certain embodiments.

FIG. 6 illustrates a flowchart 600 that shows additional exemplary operations in accordance with certain embodiments.

The operations shown in FIG. 6 are for format change computational storage operations to optimize garbage collection to opportunistically free additional capacity. The process for performing the operations include:

1) Enabling a computational storage mechanism to perform an operation (format conversion) and upon completion, store the range in a buffer on the device (at block 602);
2) Allocating, once a storage controller has knowledge of the size of the buffer, capacity on the device as the new destination location, and the new buffer is written to disk, and this is marked as the new write location of a range of capacity (at block 604);
3) Identifying, when performing initial write I/Os, ranges of the disk associated with the data format, and based on this, estimates are made as to what savings could be made, and a garbage collection heap structure is used to select what range to garbage collect next (at block 606); and
4) Allowing the garbage collection mechanism to schedule the operations and reclaim consistent amounts of space (at block 608).

Figure 7:
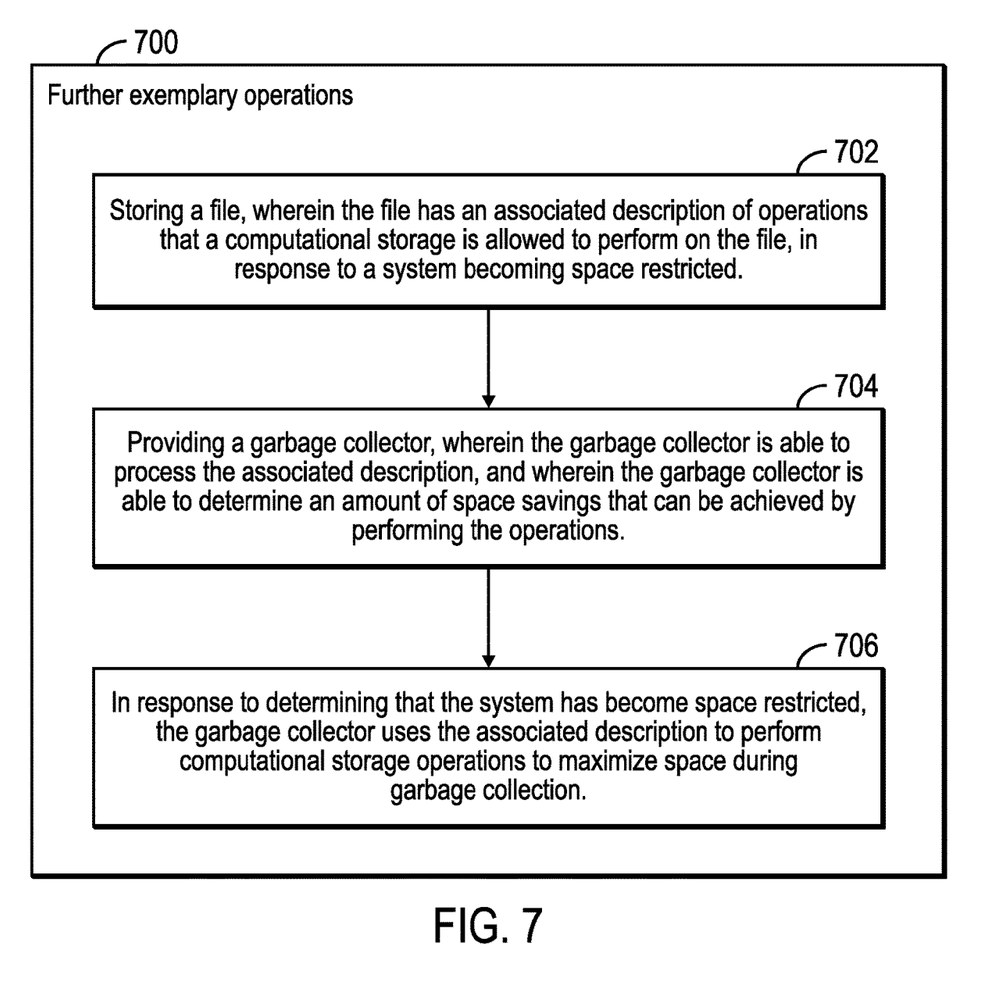
FIG. 7 illustrates a flowchart that shows further exemplary operations in accordance with certain embodiments.

FIG. 7 illustrates a flowchart 700 that shows further exemplary operations in accordance with certain embodiments.

There may be other types of embodiments than those described in FIGS. 1-6. For example, in certain embodiments there may be a collection of logs stored on disk, and a user may want to perform operations against the logs, where the operations may include analyzing for a set of bugs, reduction to a digest of datapoints, etc., and then generate the results for storing. That is not exactly format conversion or traditional compression, but such a process may reduce the size of the file and perform useful processing in the computational storage rather than require a central processing unit of the storage controller to perform the processing. Of course, the logs give more information in themselves, and so the reduction is lossy, It could be generally regarded as a reduction in storage space requirements and a manner of compression.

For example, in certain embodiments the following operations may be performed as shown in FIG. 7:

1) Storing a file, wherein the file has an associated description of operations that a computational storage is allowed to perform on the file, in response to a system becoming space restricted (at block 702);
2) Providing a garbage collector, wherein the garbage collector is able to process the associated description, and wherein the garbage collector is able to determine an amount of space savings that can be achieved by performing the operations (at block 704); and
3) In response to determining that the system has become space restricted, the garbage collector uses the associated description to perform computational storage operations to maximize space during garbage collection (at block 706).

Figure 8:
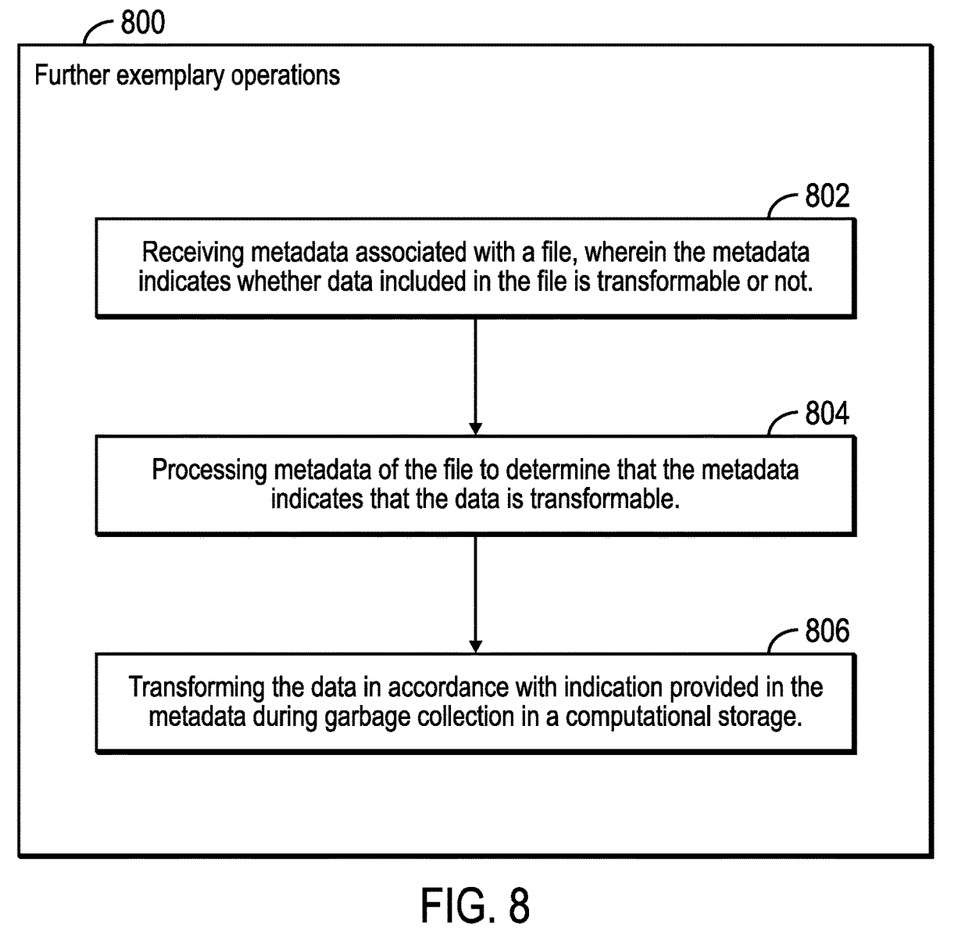
FIG. 8 illustrates a flowchart that shows yet further exemplary operations in accordance with certain embodiments.

FIG. 8 illustrates a flowchart 800 that shows yet further exemplary operations in accordance with certain embodiments.

Control starts at block 802 in which metadata associated with a file is received, where the metadata indicates whether data included in the file is transformable or not. The metadata of the file is processed to determine (at block 804) that the metadata indicates that the data is transformable. Control proceeds to block 806, in which the data is transformed in accordance with indication provided in the metadata during garbage collection in a computational storage.

Therefore, FIGS. 1-8 illustrate certain embodiments in which garbage collection and transformation of data are performed during garbage collection via a computational storage 104 to which tasks are offloaded by a storage controller 102.

In additional embodiments, the computational capabilities of the computational storage 104 may be used not only for compression or deduplication operations, but other additional operations. For example, database operations may be performed against locally stored components of a table, thereby negating the need to stage the data into a server for processing.

In certain, I/O operations are performed in the following sequence: Writing the new data to the data domain; Updating the forward lookup structure to the new location; Marking the range as invalid in a reverse lookup structure; Once there is sufficient capacity in a range of the data domain that has been marked as invalid, garbage collection attempts to vacate the range by migrating any remaining valid capacity to a new location in the data domain. This leaves a contiguous range of capacity that can be marked as free for reuse.

While garbage collection operates over the physical domain, the filesystem operates over the virtual domain, and it would not be unreasonable to be able to detect file headers and try to allocate and garbage collect write streams associated with them in a contiguous fashion in the physical domain. Alternatively, this could operate over the virtual domain although with more complexity on how space savings relate to physical extents.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 9:
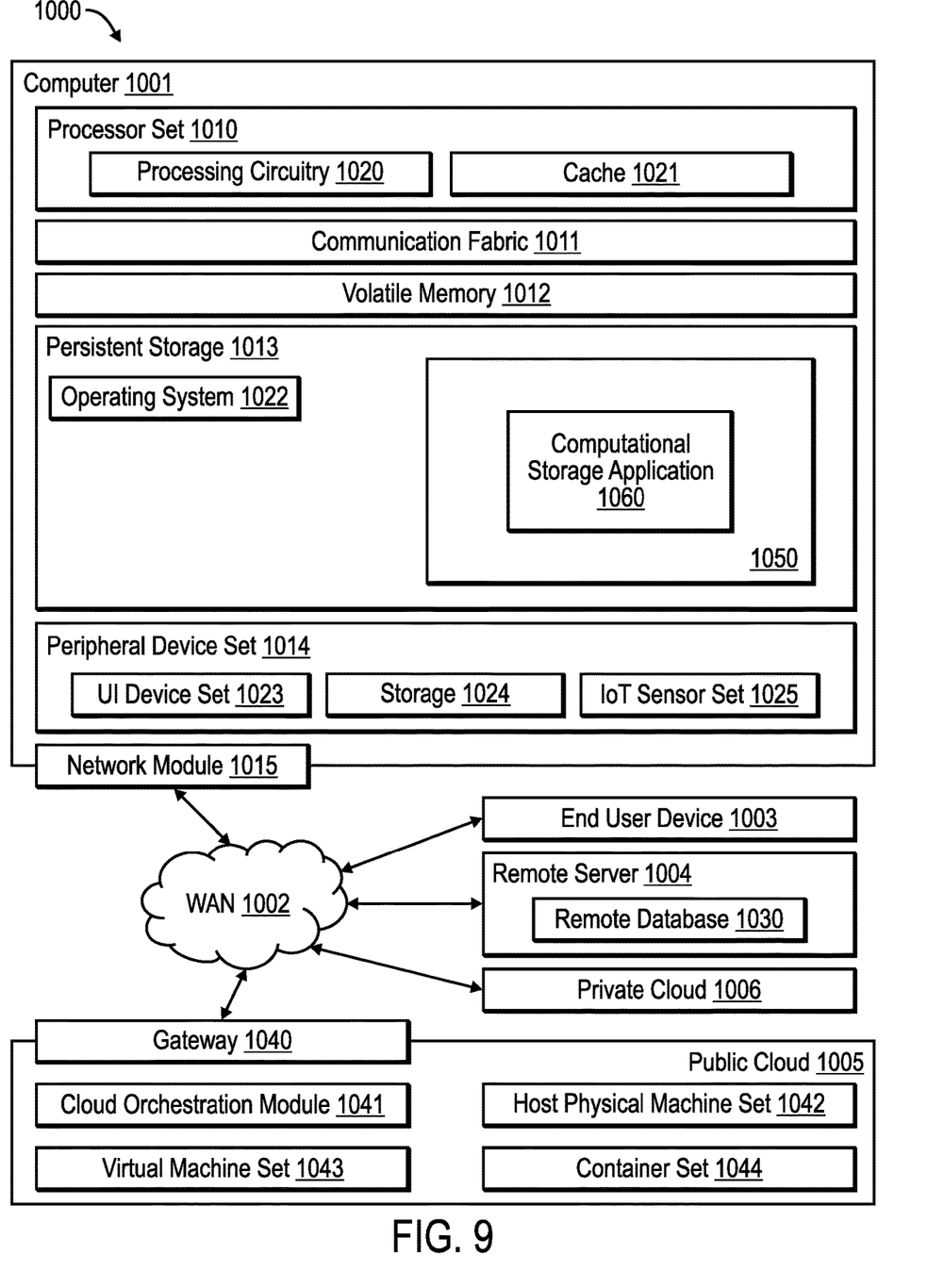
FIG. 9 illustrates a computing environment in which certain components may be implemented, in accordance with certain embodiments.

In FIG. 9 computing environment 1000 contains an example of an environment for the execution of at least some of the computer code (block 1050) involved in performing the operations of a computational storage application 1060 that may perform operations shown in FIGS. 1-8.

In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible computer 1001 may be located in a cloud, even though it is not shown in a cloud in FIG. 8. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface-type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. I/O T sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
receiving metadata associated with a file, wherein the metadata indicates whether data included in the file is transformable or not;
processing the metadata to determine that the metadata indicates that the data is transformable; and
transforming the data in accordance with indication provided in the metadata during garbage collection in a computational storage, wherein the transforming of the data includes compressing of the data, and wherein the computational storage performs the garbage collection and the compressing of the data offloaded to the computational storage by a storage controller.

2. The method of claim 1, wherein thin provisioning and deduplication are implemented in the storage controller and the computational storage.

3. The method of claim 1, wherein lossy compression is performed by using the metadata, and wherein the metadata is included in a header of the file.

4. The method of claim 1, the method further comprising:
enabling the computational storage to perform format conversion and upon completion, store a range in a buffer on a device; and
allocating, once the storage controller has knowledge of a size of the buffer, capacity on the device as a new destination location, wherein a new buffer is written to disk and marked as a new write location of a range of capacity.

5. The method of claim 1, the method further comprising:
identifying, while performing initial write input/output (I/O) operations, ranges of a disk associated with a data format, and based on the ranges, estimates are made as to what savings can be made, and a garbage collection heap structure is used to select what range to garbage collect next.

6. The method of claim 1, the method further comprising:
allowing a garbage collection mechanism to schedule operations and reclaim consistent amounts of space.

7. A system, comprising:
a memory; and
a processor coupled to the memory, wherein the processor performs operations, the operations comprising:
receiving metadata associated with a file, wherein the metadata indicates whether data included in the file is transformable or not;
processing the metadata to determine that the metadata indicates that the data is transformable; and
transforming the data in accordance with indication provided in the metadata during garbage collection in a computational storage, wherein the transforming of the data includes compressing of the data, and wherein the computational storage performs the garbage collection and the compressing of the data offloaded to the computational storage by a storage controller.

8. The system of claim 7, wherein thin provisioning and deduplication are implemented in the storage controller and the computational storage.

9. The system of claim 7, wherein lossy compression is performed by using the metadata, and wherein the metadata is included in a header of the file.

10. The system of claim 7, the operations further comprising:
enabling the computational storage to perform format conversion and upon completion, store a range in a buffer on a device; and
allocating, once the storage controller has knowledge of a size of the buffer, capacity on the device as a new destination location, wherein a new buffer is written to disk and marked as a new write location of a range of capacity.

11. The system of claim 7, the operations further comprising:
identifying, while performing initial write input/output (I/O) operations, ranges of a disk associated with a data format, and based on the ranges, estimates are made as to what savings can be made, and a garbage collection heap structure is used to select what range to garbage collect next.

12. The system of claim 7, the operations further comprising:
allowing a garbage collection mechanism to schedule operations and reclaim consistent amounts of space.

13. A computer program product, the computer program product comprising a computer readable storage medium having computer readable program code embodied therewith, the computer readable program code when executed is configured to perform operations, the operations comprising:
receiving metadata associated with a file, wherein the metadata indicates whether data included in the file is transformable or not;
processing the metadata to determine that the metadata indicates that the data is transformable; and
transforming the data in accordance with indication provided in the metadata during garbage collection in a computational storage, wherein the transforming of the data includes compressing of the data, and wherein the computational storage performs the garbage collection and the compressing of the data offloaded to the computational storage by a storage controller.

14. The computer program product of claim 13, wherein thin provisioning and deduplication are implemented in the storage controller and the computational storage.

15. The computer program product of claim 13, wherein lossy compression is performed by using the metadata, and wherein the metadata is included in a header of the file.

16. The computer program product of claim 13, the operations further comprising:
enabling the computational storage to perform format conversion and upon completion, store a range in a buffer on a device; and
allocating, once the storage controller has knowledge of a size of the buffer, capacity on the device as a new destination location, wherein a new buffer is written to disk and marked as a new write location of a range of capacity.

17. The computer program product of claim 13, the operations further comprising:
identifying, while performing initial write input/output (I/O) operations, ranges of a disk associated with a data format, and based on the ranges, estimates are made as to what savings can be made, and a garbage collection heap structure is used to select what range to garbage collect next.

18. The computer program product of claim 13, the operations further comprising:
allowing a garbage collection mechanism to schedule operations and reclaim consistent amounts of space.

* * * * *